United States Patent [19]

Tsuya et al.

[11] 3,818,564
[45] June 25, 1974

[54] METHOD FOR MANUFACTURE OF SELF-LUBRICATING, WEAR-RESISTANT COMPOSITE MATERIAL

[75] Inventors: Yuko Tsuya, Saitama-ken; Hirofumi Shimura, Tokyo, both of Japan

[73] Assignee: Agency of Industrial Science & Technology, Tokyo, Japan

[22] Filed: Nov. 29, 1972

[21] Appl. No.: 310,268

Related U.S. Application Data

[63] Continuation-in-part of Ser. No. 129,583, March 30, 1971, abandoned.

[30] Foreign Application Priority Data

Apr. 2, 1970 Japan.............................. 45-28070

[52] U.S. Cl.......................................... 29/149.5 PM
[51] Int. Cl.......................................... B21d 53/10
[58] Field of Search.......... 29/149.5 PM, 149.5 R, 29/149.5 NM, 191.6, 419; 308/240

[56] References Cited
UNITED STATES PATENTS

| | | | |
|---|---|---|---|
| 1,449,488 | 3/1923 | Ball.................................... | 308/240 |
| 1,620,530 | 3/1927 | Field.......................... | 29/149.5 PM |
| 2,577,187 | 12/1951 | Fox.................................... | 29/419 X |
| 2,607,982 | 8/1952 | Hack et al. ........................ | 29/191.6 |

*Primary Examiner*—Thomas H. Eager
*Attorney, Agent, or Firm*—Kurt Kelman

[57] ABSTRACT

Disclosed is a method for manufacturing a self-lubricating, wear-resistant composite material by compressing a tiered array of copper nets, burning the molded skeleton in a vacuum and impregnating the sintered skeleton with a solid lubricant.

4 Claims, No Drawings

3,818,564

METHOD FOR MANUFACTURE OF SELF-LUBRICATING, WEAR-RESISTANT COMPOSITE MATERIAL

REFERENCE TO COPENDING APPLICATION

This is a continuation-in-part of our copending application Ser. No. 129,583, filed Mar. 30, 1971, now abandoned.

BACKGROUND OF THE INVENTION

This invention relates to a method for the manufacture of a self-lubricating wear-resistant composite material having a low coefficient of friction, excelling in durability and possessing flexibility.

It has heretofore been known that a self-lubricating, wear-resistant composite material formed by sintering copper, stainless steel or other metal in the form of powder and impregnating the resultant sintered mass with a liquid lubricant is extensively used in the manufacture of oil-less bearings. Hopes are entertained that the said composite material could further be improved in load-bearing property and heat-resisting property if the sintered mass was impreganted with a solid lubricant or polytetrafluoroethylene (PTFE) in place of a liquid oil. A sintered mass obtained by the conventional technique, however, has formed therein pores which are too fine to permit easy penetration of a solid lubricant. This explains why the impregnation of such sintered mass with a solid lubricant has to date proved to be a difficulty. A composite material formed by mixing a solid lubricant in advance with metal powder, molding the resulting mixture by compression and thereafter sintering the molded mass has also been known to the art. Despite its adequate self-lubricating property and wear resistance, however, this composite material has proved to have inferior strength.

It is the primary object of this invention to overcome the drawbacks suffered by the conventional wear-resistant composite materials and provide a method for manufacturing self-lubricating, wear-resistant composite material which excels in flexibility and wear resistance.

BRIEF SUMMARY OF THE INVENTION

To accomplish the object mentioned above, this invention causes the composite material to be produced by compressing tiered array of copper nets in a mold, burning the resulting molded skeleton at about 800°C thereby sintering the metal cords which have by now been brought into contact with one another within the skeleton and impregnating the resulting sintered skeleton with a solid lubricant. Since the composite material according to the present invention thus uses metal nets as the starting material, the product does, even after the step of sintering, possess flexibility far superior to that of the product obtained by sintering a metal powder and, therefore, shows very high durability against impacts. In addition, since the individual pores formed within the sintered skeleton to permit penetration of a solid lubricant are larger than those in the sintered mass produced from a metal powder, the product of this invention can easily be impregnated with the lubricant. The porosity of the sintered skeleton can readily be adjusted by suitably selecting the number of meshes in the metal nets being used. Thus, this invention can provide composite materials suitable for a wide variety of applications.

Other objects and other characteristic features of this invention will become apparent from the further detailed description to be given hereinafter.

DETAILED DESCRIPTION OF INVENTION

The inventors carried out a study on starting materials for wear-resistant composite materials. As a consequence, they have discovered that a composite material strikingly excelling in wear resistance and shock durability is obtained by sintering tiered array of metal nets and impregnating the resulting sintered skeleton with a solid lubricant rather than using a sintered mass obtained by burning a metal powder.

Metal nets which are used as the starting material for the present invention are those made of copper or of nickel. For the purpose of certain applications, it is permissible to use metal nets which are formed of alloys containing such metals.

The coarseness of the net is selected from the range of about 25 – 80 mesh. Metal nets of this coarseness are tiered to a suitable thickness. The tiered array of nets is then compressed in a mold of a desired shape under a pressure of 1 – 3 tons/cm$^2$. No sufficient molding is obtained where the pressure does not exceed 1 ton/cm$^2$. If a pressure exceeding 3 tons/cm$^2$ is applied to bear on an array of about 40 or more nets, then the sintered skeleton obtained from the resulting molded skeleton will have a porosity failing to reach 20 percent. Consequently, such sintered skeleton cannot be impregnated with a sufficient quantity of solid lubricant.

The molded skeleton thus obtained by compression is burnt in vacuum at about 800°C. Consequently, the individual metal nets are sintered at points at which their component cords are held in contact, giving birth to a porous sintered skeleton having porosity of 40 – 25 percent. The sintering is required to be given for a period long enough for the metal nets to be sufficiently sintered at points of contact. Generally, this period falls in the range of two to three hours.

The resulting sintered skeleton is converted into a composite material by being impregnated with a solid lubricant.

Examples of the solid lubricant used for this impregnation are molybdenum dislufide, graphite and tungsten disulfide. These solid lubricants are dissolved in such solvents as ethyl alcohol and hexanol which serve as their carriers. The penetration of such solutions into the sintered skeleton is accelerated by virtue of forced dispersion with a compressor, suction with a vacuum pump or centrifugation with a centrifugal separator. Particularly since the sintered skeleton obtained by this invention is produced from metal nets, the pores formed therein are larger than those formed in the conventional sintered mass produced from metal powder. In the case of the sintered skeleton of this invention, therefore, sufficient impregnation can be accomplished only by immersing the said skeleton in the solvent containing the solid lubricant or by brushing the solvent onto the skeleton.

In some cases, incorporation of PTFE, polyimide or a suitable phenol resin results in conspicuous enhancement of the effect of such solid lubricant. Use of niobium selenide or other similar substance as the solid lubricant serves the purpose of conferring electroconductivity upon the composite.

Since the composite obtained in consequence of the impregnation of solid lubricant possesses flexibility, it can be elevated in density as by remolding or heat treatment.

If the solid lubricant selected for the purpose of impregnation is proof against fire, metal nets may be impregnated with this solid lubricant in the course of formation of the tiered array, so that the tiered array of lubricant-impregnated nets will then be compressed in a mold and thereafter sintered.

The voids in the sintered skeleton produced from the tiered array of metal nets are larger and enjoy better continuity than those in the conventional sintered mass produced from metal powder. Thus, the sintered skeleton of this invention permits easier penetration of solid lubricant. Since the sintered skeleton enjoys excellent flexibility, it may be placed in the mold and remolded so that no void will escape being filled with the lubricant. This complete elimination of unfilled voids contributes to enhancing mechanical strength, wear resistance, durability and other properties to a marked extent. A composite formed by sintering a metal powder and impregnating the resulting sintered mass with molybdenum disulfide according to the conventional technique, for example, withstood only about 8,000 frictions of 1kg point contact. By contrast, a composite formed from a tiered array of metal nets withstood well over one hundred thousand frictions under the same condition. The latter composite was formed by using metal nets as its substrate and, therefore, remained unbroken by shocks. In a bending test, a composite produced from copper powder produced cracks immediately after the test was started. A composite according to the present invention produced no crack even when it was bent until the two free ends were brought nearly into direct contact.

DESCRIPTION OF THE PREFERED EMBODIMENTS

Preferred embodiments of this invention will be cited hereinafter. They are illustrative of this invention and are not to be regarded as limitative in any way.

EXAMPLE 1:

A tiered array of 40 copper nets with 50 mesh was compressed for three minutes under a pressure of 1.5 tons/cm$^2$ to obtain a molded skeleton about 3.5 mm in thickness. This molded skeleton was heated at about 800°C for two hours. With the aid of a compressor, the resultant sintered skeleton was impregnated with molybdenum disulfide having an average grain size of 0.5 micron and blended intimately with ethyl alcohol. The coefficient of friction exhibited by the resultant wear-resistant composite was 0.07. The durability was found to be several times as high as that of a composite produced from a metal powder.

EXAMPLE 2:

Tiered arrays each of 50 copper nets of 50 mesh were compressed for three minutes under a pressure of 3 tons/cm$^2$. The resultant molded skeletons were burnt in vacuum at about 700°C for three hours. The porosity of the resultant sintered skeletons was about 27 percent.

The sintered skeletons thus obtained were impregnated, by the use of a centrifugal separator, respectively with a highly concentrated molybdenum disulfide suspension, a PTFE dispersion containing 5 percent of molybdenum disulfide and molybdenum disulfide carried in hexanol. The resultant composites were tested for specific coefficient of friction. The results were as shown in Table 1.

For a comparative test, copper powder having a grain size of from 100 to 200 mesh was molded under compression and burnt in vacuum at 700°C. The resultant sintered masses were impregnated, by the use of a centrifugal separator, respectively with a high concentrated molybdenum disulfide suspension and a PTFE dispersion containing 5 percent of molybdenum disulfide.

TABLE 1

| Lubricant | Composite material produced from copper powder (mg/kg·mm) | Composite material according to the present invention |
|---|---|---|
| Highly concentrated molybdenum disulfide suspension | $2 \times 10^{-6}$ | $9 \times 10^{-5}$ |
| PTFE dispersion containing 5% of molybdenum disulfide | $2 \times 10^{-7}$ | — |
| molybdenum disulfide (hexanol as carrier) | $7 \times 10^{-7}$ | $9 \times 10^{-5}$ |

EXAMPLE 3:

Tiered arrays each of 40 copper nets of 25 mesh were compressed under a pressure of 1.5 tons/cm$^2$. The resultant molded skeletons were burnt in vacuum at about 800°C for 150 minutes. The porosity of the resultant sintered skeletons was about 42 percent.

The sintered skeletons were impregnated, by the use of a compressor, respectively with a 1:1 mixture of tungsten disulfide and polyimide carried in hexane, a 6:3:1 mixture of molybdenum disulfide, graphite and a resin carried in hexanol and tungsten disulfide alone carried in hexanol. The resultant composites were tested for specific coefficient of friction.

The results were as shown in Table 2.

TABLE 2

| Lubricant | Specific coefficient of friction (mg/kg·mm) |
|---|---|
| Tungsten+polyimide | $5 \times 10^{-8}$ |
| Molybdenum disulfide +graphite+resin | $2 \times 10^{-7}$ |
| Tungsten disulfide | $7.4 \times 10^{-7}$ |

What is claimed is:

1. A method for the manufacture of a self-lubricating, wear-resistant composite material, comprising the steps of compressing a tiered array of copper nets under a pressure of 1 – 3 tons/cm$^2$, burning the resultant molded skeleton in vacuum at about 800°C and impregnating the sintered skeleton with a solid lubricant.

2. A method according to claim 1, wherein the metal nets have a coarseness of 25 – 75 mesh.

3. A method according to claim 1, wherein the porosity of the sintered skeleton is 25 – 45 percent.

4. A method of making a self-lubricating, wear-resistant composite material, comprising the steps of compressing a tiered array of copper nets, sintering the resultant molded skeleton at about 800°C. and impregnating the resultant sintered skeleton with a solid lubricant.

* * * * *